United States Patent [19]

Sano et al.

[11] Patent Number: 4,557,493

[45] Date of Patent: Dec. 10, 1985

[54] STEERING DEVICE FOR VEHICLES

[75] Inventors: Shoichi Sano, Tokyo; Yoshimi Fufukawa, Saitama, both of Japan

[73] Assignee: Honda Giken Kogyo Kabushiki Kaisha, Tokyo, Japan

[21] Appl. No.: 658,078

[22] Filed: Oct. 5, 1984

Related U.S. Application Data

[63] Continuation of Ser. No. 407,432, Aug. 12, 1982, abandoned.

[30] Foreign Application Priority Data

Aug. 12, 1981 [JP] Japan ................... 56-127188

[51] Int. Cl.$^4$ ............................................. B62D 7/00
[52] U.S. Cl. ........................................ 280/91; 74/50; 180/240
[58] Field of Search ............... 180/140, 234, 236, 240; 280/771, 91, 95 R, 95 A, 96, 98, 99, 103; 74/39, 40, 42, 43, 50, 89, 89.16, 89.2, 496, 498

[56] References Cited

U.S. PATENT DOCUMENTS

| | | | |
|---|---|---|---|
| 2,537,195 | 1/1951 | Stoeckig | 74/50 |
| 2,986,948 | 6/1961 | Jensen | 74/50 |
| 3,677,313 | 7/1972 | Hessler | 74/50 |
| 4,272,917 | 6/1981 | Smith, III et al. | 280/95 R |
| 4,406,472 | 9/1983 | Furukawa | 280/91 |

*Primary Examiner*—Joseph F. Peters, Jr.
*Assistant Examiner*—Ross Weaver
*Attorney, Agent, or Firm*—Irving M. Weiner; Joseph P. Carrier; John J. Cantarella

[57] ABSTRACT

A steering device for a vehicle including a steering wheel, front wheels and a steering mechanism therefor, rear wheels and a steering mechanism therefor, a pair of rear wheel steering tie rods connecting the rear wheels with the rear wheel steering mechanism, and an operating shaft connecting the front wheel steering mechanism with the rear wheel steering mechanism, the rear wheels being steered along with the front wheels under a steering operation of the steering wheel. The rear wheel steering mechanism includes a crank member rotated under rotation of the operating shaft and extending in a radially outward direction of the operating shaft, and a connecting member having the ends thereof connected to the inner ends of the tie rods and extending in the width direction of the vehicle while being movable in such direction. Upon rotation of the crank member, the rear wheels are steered in the same direction as that of the front wheels during small steering angle operation of the steering wheel, and during large steering angle operation of the steering wheel the rear wheels are steered in a direction opposite to that of the front wheels or the steering angle of the rear wheels is reset to zero or near zero. By virtue of such arrangement, the tie rods may be shortened in accordance with a desired suspension characteristic.

3 Claims, 5 Drawing Figures

STEERING DEVICE FOR VEHICLES

This is a continuation of application Ser. No. 407,432, filed Aug. 12, 1982, now abandoned.

BACKGROUND OF THE INVENTION

1. Field of the Invention

The present invention relates to a vehicle steering device in which both the front wheels and the rear wheels are steered.

2. Description of Relevant Art

U.S. Pat. No. 4,295,657, issued on Oct. 20, 1981 to the present applicants, discloses a vehicle steering device in which the front wheels and the rear wheels are steered under a steering operation of the steering wheel. The vehicle steering device is constructed such that the rear wheels are steered in the same direction as that of the front wheels when the steering wheel is rotated a small angular extent, such as generally occurs during high speed driving of the vehicle, and to the contrary, during large angle steering operation of the steering wheel when driving at a low vehicle speed, the rear wheels are steered in a direction opposite to that of the front wheels or a rear wheel steering angle is reset to zero or to a value near zero. Thereby, a difference in time for producing lateral forces in the front wheels and the rear wheels is eliminated, non-coincidence between the direction of the vehicle and the tangential direction of the turning orbit is eliminated and at the same time a steering characteristic for the vehicle during high speed driving is improved, and rotating performance of the steering wheel during low speed driving of the vehicle is also improved or is facilitated to such a degree as to be similar to that provided by a conventional type of vehicle in which only the front wheels are steered.

In a conventional type of vehicle, the rear wheels are normally suspended by a suspension mechanism comprising a shock absorber, lower arms, etc., in such a manner as to be capable of swinging in a vertical direction. However, it is sometimes necessary to shorten the lower arms in response to a characteristic of the suspension desired in the suspension mechanism, and in this case, in a device in which the rear wheels are steered along with the front wheels, the length of the right and left tie rods for use in steering the rear wheels is also shortened and the opposing ends of both tie rods are spaced apart. As a result, the rear wheel steering means is required to be installed between the tie rods in the width or transverse direction of the vehicle.

The present invention provides a steering device which effectively meets the foregoing requirements.

SUMMARY OF THE INVENTION

The present invention provides a vehicle steering device comprising a steering wheel, right and left front wheels, front wheel steering means, right and left rear wheels, rear wheel steering means, a pair of right and left rear wheel steering tie rods for connecting the right and left rear wheels and the rear wheel steering means, and an operating shaft for connecting the front wheel steering means and the rear wheel steering means, the rear wheels being steered along with the front wheels under a steering operation of the steering wheel. The rear wheel steering means is provided with a crank member rotated under a rotation of the operating shaft and extending in a radially outward direction of the operating shaft, and a connecting member having the ends thereof connected to inner ends of the right and left tie rods and extending in a width or transverse direction of the vehicle and movable in the width or transverse direction of the vehicle, the crank member and the connecting member being slidably engaged with each other.

It is an object of the present invention to provide a vehicle steering device in which the front wheels are steered along with the rear wheels under a steering operation of the steering wheel, the rear wheels are steered in the same direction as that of the front wheels under a small steering angle operation of the steering wheel, and to the contrary when a large steering angle operation of the steering wheel is performed, the rear wheels are steered in an opposite direction to that of the front wheels or a rear wheel steering angle is reset to zero. Further, when it is necessary to shorten the lower arms, they may be shortened so as to correspond to the shortened right and left rear wheel steering tie rods.

The above and further objects, details and advantages of the present invention will become apparent from the following detailed description of preferred embodiments of the invention, when read in conjunction with the accompanying drawings.

DETAILED DESCRIPTION OF PREFERRED EMBODIMENTS

Figure 1:
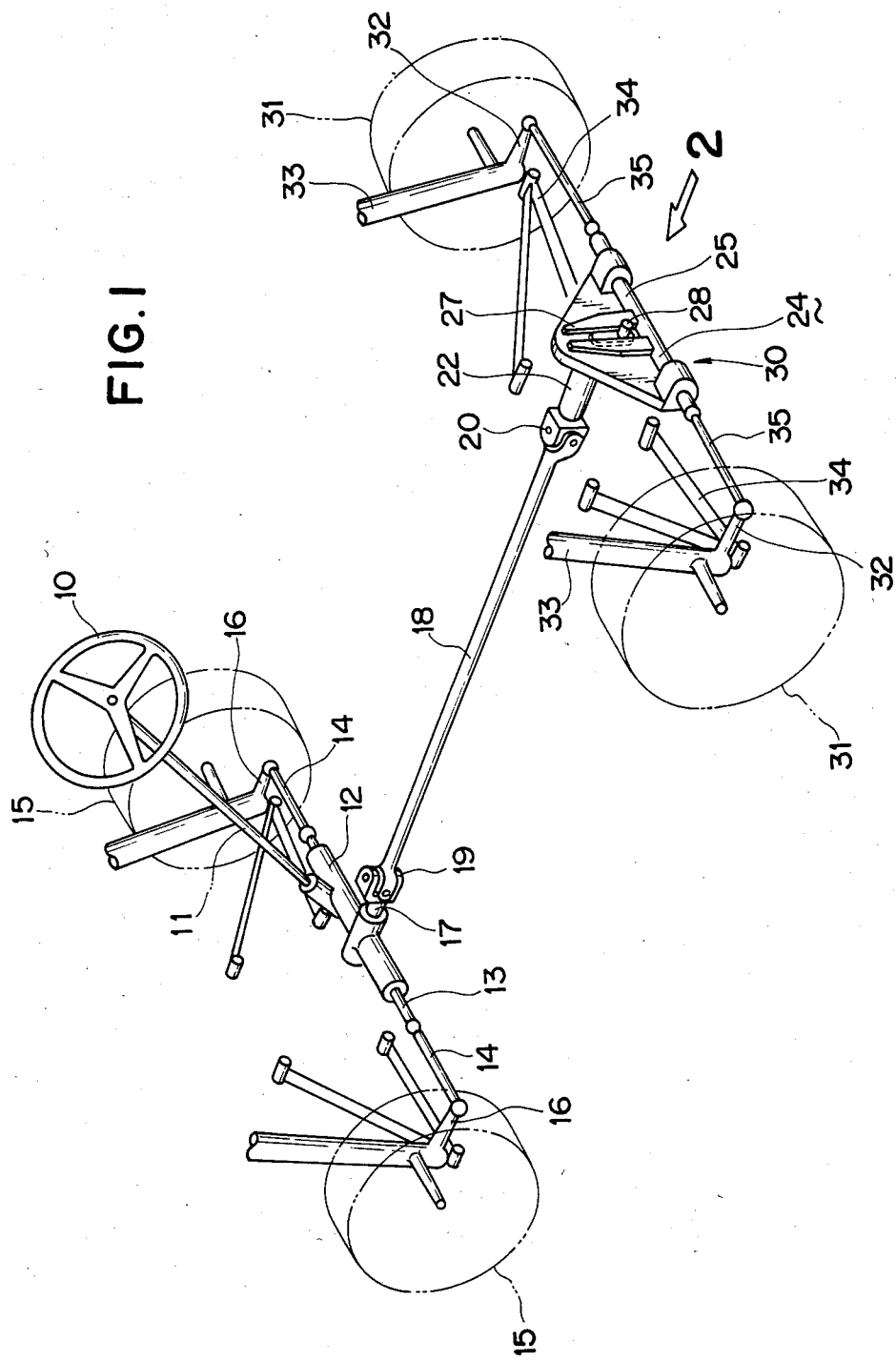
FIG. 1 is a perspective view showing schematically the fundamental structure of a vehicle provided with a steering device constructed in accordance with a first preferred embodiment of the present invention.

With reference to FIG. 1, there is shown a first preferred embodiment of the present invention. A steering shaft 11 for the steering wheel 10 operated by the driver is connected to a direction changing means installed in a gear box 12, and steering rotation of the steering wheel 10 is transformed to a movement in the vehicle width or transverse direction of right and left front wheel steering tie rods 14, 14 through a connecting rod 13 under, for example, a rack-and-pinion type of direction changing means. Outer ends of both tie rods 14, 14 are connected to knuckle arms 16, 16 which support the front wheels 15, 15 and which may be steered in a rightward or leftward direction, and the front wheels 15, 15 are steered in a steering direction of the steering wheel 10 under the movement of the tie rods 14, 14.

The above-described arrangement of the front wheel steering means is the same as that of a conventional type, and the steering operation of the steering wheel 10 is aided by a power steering device by arranging such device in the gear box 12.

A connecting shaft 17 is connected to the inner mechanism of the gear box 12 through an operating force transmitting means such as a rack and pinion, bevel gear, and worm gear, etc. A front end of an operating shaft 18 extended in substantially the longitudinal direction of the vehicle is connected to the connecting shaft 17 through a universal joint 19.

Figure 2:
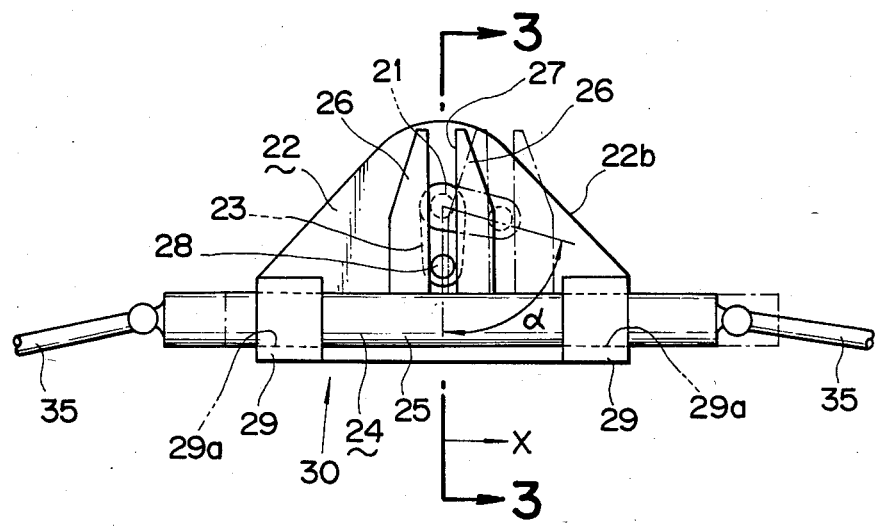
FIG. 2 is a view taken along arrow 2 in FIG. 1.
Figure 3:
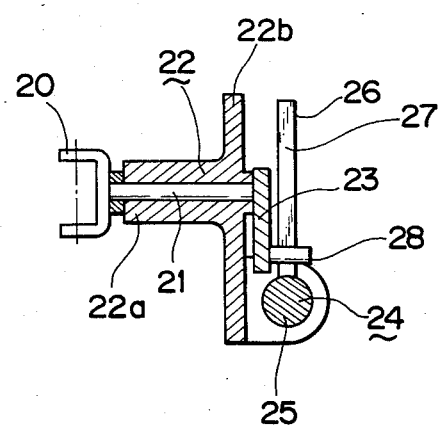
FIG. 3 is a sectional view taken along line 3—3 of FIG. 2.

To the rear end of the operating shaft 18 is connected an input shaft 21, shown in FIG. 3, through a universal joint 20. The input shaft 21, with its axial dimension extending in the longitudinal direction of the vehicle, is rotatably supported in a bearing 22a in a bracket 22 fixed to the vehicle body. When the steering wheel 10 is rotated, the operating shaft 18 is rotated through the internal mechanism in the gear box 12 and the connecting shaft 17, and the input shaft 21 is cooperatively rotated with the steering wheel 10. The rear end of the input shaft 21 is extended to the back plate 22b of the bracket 22. One end of a crank member 23 extending in a radially outward direction of the input shaft 21 is integrally connected to the rear end of the input shaft 21, the crank member 23 being rotated in a vertical plane around a center of the connecting end with the input shaft 21, and when the vehicle is moved in a forward direction, i.e., when the steering wheel 10 is in its neutral position, the crank member 23 as shown in FIG. 2 is set in a substantially vertical orientation.

At the rear side of the back plate 22b of the bracket 22 is arranged a tie rod connecting member 24, the tie rod connecting member 24 being comprised of a connecting rod 25 having its longitudinal direction extending in the width direction of the vehicle, and a pair of guide plates 26, 26 fixed in a spaced apart upright relation at the upper circumference of the connecting rod 25, i.e., in the vehicle width direction. In this manner, the tie rod connecting member 24 is provided with a guide groove 27 having a consistent width, with its longitudinal dimension extending substantially vertically, between the pair of guide plates 26, 26, the guide groove 27 being disposed in oppositely facing relation to the crank member 23 in the longitudinal direction of the vehicle. The crank member 23 is formed as a plate, and to the end of the crank member 23 opposite to the connecting end with the input shaft 21 is fixed a pin 28 projecting rearwardly, the pin 28 being inserted into and engaged with the guide groove 27. The pin 28 comprises an engagement member for use in connecting the crank member 23 and the tie rod connecting member 24. The connecting rod 25 is inserted into bearing holes 29a, 29a in shaft supporting bosses 29, 29 projected in a rightward or a leftward direction at the lower part of the back plate 22b of the bracket 22, and is supported in such a manner as to permit movement thereof in a rightward or a leftward direction. Thereby, the tie rod connecting member 24 is moved horizontally in the vehicle width direction under a depressing operation of the pin 28 toward the guide plate 26 as the crank member 23 is rotated.

The rear wheel steering means 30 is of a crank mechanism type and comprises the input shaft 21, crank member 23, and the tie rod connecting member 24 having the guide groove 27. The crank member 23 and the tie rod connecting member 24 are slidably engaged with each other when the pin 28 is inserted into the guide groove 27, and the rear wheel steering means 30 is constructed such that the connecting rod 25 of the tie rod connecting member 24 is extended in a rightward or a leftward direction, so that it has a substantial length in the vehicle width direction.

As shown in FIG. 1, the right and left rear wheels 31, 31 are supported by knuckle arms 32, 32 which may be steered in a rightward or leftward direction, the knuckle arms 32, 32 being suspended by shock absorbers 33 having the upper ends thereof connected to the vehicle body and by the lower arms 34 having the inner ends thereof pivotally attached to the vehicle body in such a manner as to permit swinging thereof in a vertical direction.

The lower arms 34 of a vehicle provided with the device according to the present invention are shortened in accordance with a characteristic of suspension desired for the rear wheel suspension mechanism comprised of shock absorbers 33 and lower arms 34, etc. To the right and left knuckle arms 32, 32 are connected the outer ends of right and left tie rods 35, 35 for use in steering the rear wheels, the knuckle arms 32 being steered in a rightward or leftward direction and the rear wheels 31 being steered by an operation wherein the tie rods 35 are moved in the vehicle width direction.

As shown in FIG. 2, the inner ends or opposite ends of the right and left rear wheel steering tie rods 35, 35 are respectively connected to the ends of the connecting rod 25, and the tie rods 35, with the longitudinal dimension thereof extending in the vehicle width direction, are shortened due to the fact that the lower arms 34 are shortened as described hereinabove. However, because the rear wheel steering means 30 is constructed so as to extend in the vehicle width direction as described above, the right and left tie rods 35, 35 may be connected with each other through the tie rod connecting member 24 and a shortened length of the tie rod 35 may be accommodated by the length of the connecting rod 25.

When the steering wheel 10 is rotated in a leftward direction, the front wheels 15 are steered in a leftward direction, and the crank member 23 is integrally rotated with the input shaft 21 as illustrated in FIG. 2 by the dotted line. To the contrary, when the steering wheel 10 is rotated in a rightward direction, the steering direction of the front wheels 15 and the rotating direction of the crank member 23 are simply reversed, with their fundamental operation being the same as in the case of rightward steering of the steering wheel.

If the gear box 12 is provided with a power steering device, a rear wheel steering operation is performed with auxiliary power being produced from the power steering device for the front wheels 15. It is also possible to install a rear wheel power steering device in the vehicle which is separate from the front wheel power steering device.

Figure 5:
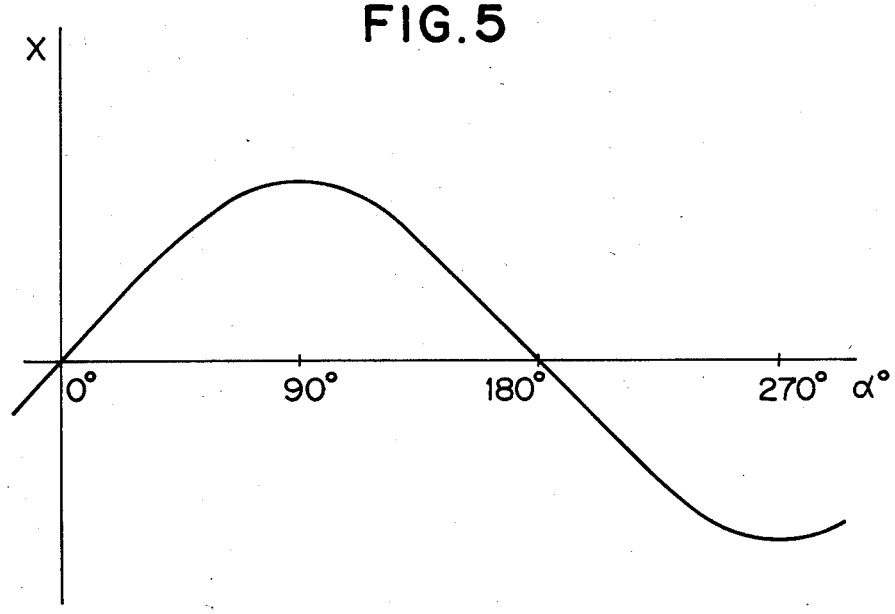
FIG. 5 is a graph showing a horizontal movement stroke of both the member for connecting the tie rods and the tie rods themselves with respect to a rotational angle of the crank member.

As shown in FIG. 2, when the crank member 23 is rotated, the tie rod connecting member 24 and the tie rods 35 are moved in a rightward or a leftward direction by the pin 28 sliding in the guide groove 27. FIG. 5 is a graph showing a relation between a value of x, which is a stroke of horizontal movement of the tie rod connecting member 24 and the tie rods 35 under a rotation of the crank member 23 by an angle of $\alpha°$. The angle of $\alpha°$ is represented on the X-axis and the value of x is represented on the Y-axis.

Because the value of x is a sine value of $\alpha°$, the value x becomes maximum when $\alpha°$ is 90°, and when the angle $\alpha°$ becomes 180°, the value x shows a reverse positive or negative value which is opposite to the foregoing values and the value x becomes maximum when the angle $\alpha°$ is 270°. Therefore, when the angle $\alpha°$ is between 0° and 180°, the rear wheels 31 are steered in the same direction as that of the front wheels 15, and further if the angle $\alpha°$ is larger than 180° the rear wheels 31 are steered in a direction opposite to that of the front wheels 15.

From the foregoing it will be understood that the operating shaft, or crank member 23, rotates from zero to approximately 270° as the steering wheel 10 is steered from the neutral position to the full steering position thereof in each steering direction.

Installation of a transmission unit such as a gear mechanism, etc., in the rear wheel steering force transmitting path starting from the steering wheel 10 to the crank member 23 and a proper setting of a rotational angle of the crank member 23 with respect to the rotational angle of the steering wheel 10 under a suitable setting of a rate of transmission of the transmission mechanism enable the front wheels 15 to be steered in the same direction as that of the rear wheels 31 under a small steering angle operation of the steering wheel 10 and in turn under a large steering angle operation, the rear wheels 31 may be steered in a direction opposite to that of the front wheels 15. In addition, the front wheels 15 and the rear wheels 31 may be steered in the same direction under a small steering angle operation of the steering wheel 10, and in turn under a large steering angle operation the steering angle of the rear wheels 31 may be reset to zero or near zero.

The value of the steering angle of the rear wheels 31 is related to a length between the input shaft 21 of the crank member 23 and the pin 28, and such length may be defined in response to a ratio of the rear wheel steering angle with respect to the front wheel steering angle which is preferable for the vehicle to which the present invention is applied.

Figure 4:
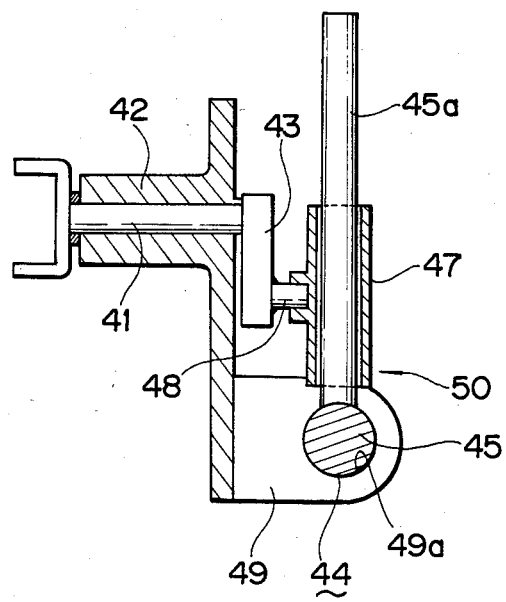
FIG. 4 is a view similar to FIG. 3, showing a second preferred embodiment of the present invention.

With reference to FIG. 4, there is shown a second preferred embodiment of the present invention. A rear wheel steering means 50 comprises, similar to that of the first embodiment, an input shaft 41 rotated in cooperation with the steering wheel, a crank member 43 connected to the input shaft 41 and having a length extending in a radially outward direction toward the input shaft 41, and a tie rod connecting member 44 having the ends thereof connected to the right and left rear wheel steering tie rods, respectively. The connecting rod 45 of the tie rod connecting member 44 is supported so as to be movable in the vehicle width direction, i.e., in a rightward or leftward direction, by a bearing hole 49a in a boss 49 of a bracket 42 connected to the vehicle body. In this embodiment, a guide cylinder 47 is pivotally connected to a pin 48 of the crank member 43, and to the connecting rod 45 is fixed a guide rod 45a extending upwardly, with a guide rod 45a being slidably inserted into the guide cylinder 47. Thus, the crank member 43 and the tie rod connecting member 44 are slidably engaged with each other at a point where the guide cylinder 47 and the guide rod 45a are installed. In this embodiment, the inner hole of the guide cylinder 47 corresponds to the guide groove 27, and the guide rod 45a corresponds to the pin 28 acting as an engaging member.

When the crank member 43 is rotated around input shaft 41, the tie rod connecting member 44 is moved linearly in the vehicle width direction under a pushing action of the guide cylinder 47 which is rotated with respect to the pin 48 and always maintains its upright orientation, and the rear wheels are thereby steered. Also in this embodiment, a relation between the rotational angle of the crank member 43 and a stroke of horizontal movement of the rear wheel steering tie rods is the same as that shown in the graph illustrated in FIG. 5.

As will be understood from the foregoing, according to the present invention, because the rear wheel steering means comprises an input shaft rotated in cooperation with a steering wheel, a crank member connected to the input shaft and having a radially outward length for extending from the input shaft, and a connecting member to which right and left rear wheel steering tie rods are connected; the lower arms may be shortened due to a suspension feature of the rear wheel suspension mechanism and thus a shortened size of the tie rods may be effectively accommodated by the tie rod connecting member.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:

1. A steering device for a vehicle comprising a steering wheel, right and left front wheels, front wheel steering means, right and left rear wheels, rear wheel steering means, a pair of right and left rear wheel steering tie rods for connecting said right and left rear wheels with said rear wheel steering means, and an operating shaft for connecting said front wheel steering means with said rear wheel steering means, said rear wheels being steered along with said front wheels under a steering operation of said steering wheel, characterized in that:

said rear wheel steering means comprises a crank member rotated under rotation of said operating shaft and extending in a radially outward direction of said operating shaft, and a connecting member having the ends thereof respectively connected to inner ends of said right and left tie rods and extending in a width direction of said vehicle while being movable in said width direction of said vehicle;

said crank member and said connecting member are slidably engaged with each other;

said crank member is set in a substantially vertical orientation when said steering wheel is in the neutral position thereof;

whereby, under a rotation of said crank member, said rear wheels are steered in the same direction as that of said front wheels during small steering angle operation of said steering wheel, and during large steering angle operation of said steering wheel, said rear wheels are steered in a direction opposite to that of said front wheels or the steering angle of said rear wheels is reset to zero or near zero;

said connecting member includes a connecting rod having a length directed in the width direction of said vehicle and supported so as to be movable in said width direction of said vehicle;

the inner ends of said right and left tie rods are respectively connected to the ends of said connecting rod;

said crank member is formed as a plate;

an end part of said crank member is fixedly provided with a pin projecting rearwardly;

said connecting rod is provided with a guide member;

said guide member is formed with a guide portion extending in a substantially vertical direction against said connection rod; and said pin and said guide portion are slidably engaged with each other.

2. A steering device for a vehicle according to claim 1, wherein:

an end part of said crank member is provided with a guide cylinder pivotally attached thereto;

said connecting rod is provided with a guide rod extending in a substantially vertical direction against said connecting rod; and said guide rod is slidably fitted in said guide cylinder.

3. A steering device for a vehicle according to claim 1, wherein:

said crank member rotates from zero to approximately 270° as said steering wheel is steered from said neutral position thereof to the full steering position thereof in each direction.

* * * * *